(12) United States Patent
Ahten et al.

(10) Patent No.: US 6,884,993 B2
(45) Date of Patent: *Apr. 26, 2005

(54) OFF-AXIS OBJECT DETECTION SYSTEM FOR A BAR CODE SCANNER

(75) Inventors: Michael J. Ahten, Eugene, OR (US); James W. Ring, Blodgett, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/640,106

(22) Filed: Aug. 12, 2003

(65) Prior Publication Data

US 2004/0046114 A1 Mar. 11, 2004

Related U.S. Application Data

(60) Continuation of application No. 09/682,660, filed on Oct. 3, 2001, now Pat. No. 6,621,070, which is a continuation of application No. 09/575,695, filed on Jul. 6, 2000, now Pat. No. 6,303,927, which is a division of application No. 08/942,399, filed on Oct. 1, 1997, now Pat. No. 6,166,375.
(60) Provisional application No. 60/027,963, filed on Oct. 8, 1996.

(51) Int. Cl.[7] .................................................. H01J 3/14
(52) U.S. Cl. ...................... 250/234; 250/566; 235/454
(58) Field of Search ................................ 250/234–236, 250/566, 568, 555; 235/454, 462.32, 462.35, 462.37, 462.42; 359/205, 212, 213, 214, 215

(56) References Cited

U.S. PATENT DOCUMENTS

| | | | |
|---|---|---|---|
| 4,488,679 A | 12/1984 | Bockholt et al. | 235/469 |
| 4,632,501 A | 12/1986 | Glynn | 350/6.6 |
| 4,786,798 A | 11/1988 | Lonsdale | 250/216 |
| 4,799,164 A | 1/1989 | Hellekson et al. | 235/467 |
| 4,843,222 A | 6/1989 | Hochgraf | 235/470 |
| 4,845,350 A | 7/1989 | Shepard et al. | 235/472 |
| 4,874,933 A | 10/1989 | Sanner | 235/470 |
| 4,902,083 A | 2/1990 | Wells | 350/6.6 |
| 4,978,860 A | 12/1990 | Bayley et al. | 250/568 |
| 5,009,473 A | 4/1991 | Hunter et al. | 350/6.6 |
| 5,187,353 A | 2/1993 | Metlitsky et al. | 235/462 |
| 5,202,784 A | 4/1993 | Reddersen | 359/196 |
| 5,298,727 A | 3/1994 | Spratte et al. | 235/462 |
| 5,347,121 A | 9/1994 | Rudeen | 250/235 |
| 5,386,105 A | 1/1995 | Quinn et al. | 235/462 |
| 5,418,356 A | 5/1995 | Takano | 235/462 |
| 5,438,187 A | 8/1995 | Reddersen et al. | 235/462 |
| 5,449,892 A | 9/1995 | Yamada | 235/462 |
| 5,479,011 A | 12/1995 | Rudeen et al. | 250/235 |
| 5,525,810 A | 6/1996 | Jewell et al. | 250/566 |
| 5,530,233 A | 6/1996 | Krichever et al. | 235/440 |
| 5,532,480 A | 7/1996 | Scofield | 250/235 |
| 5,543,609 A | 8/1996 | Giordano et al. | 235/462 |
| 5,614,706 A | 3/1997 | Bard et al. | 235/472 |

(Continued)

OTHER PUBLICATIONS

Colley et al., U.S. Appl. No. 60/027,487, filed Sep. 26, 1996 for "Dithering Assembly Incorporating Travel Stops".
Tamburrini et al., U.S. Appl. No. 60/010,935, filed Jan. 31, 1996 for "Multiple Aperture Data Reader for Multi–Mode Operation".

*Primary Examiner*—Kevin Pyo
(74) *Attorney, Agent, or Firm*—Stoel Rives LLP

(57) ABSTRACT

A scan module and an optical system such as for a bar code scanner wherein the optical system has an axis of outgoing (illumination) light offset from the axis of collected light, arranged to limit the dynamic range of the collected light and thus the dynamic range within which the bar code scanner detector and signal processor must function. Preferably, the outgoing axis and the collection lens axis are substantially parallel.

19 Claims, 9 Drawing Sheets

U.S. PATENT DOCUMENTS

| | | | | |
|---|---|---|---|---|
| 5,627,366 A | * | 5/1997 | Katz | 250/234 |
| 5,646,391 A | | 7/1997 | Forbes et al. | 235/462 |
| 5,661,290 A | | 8/1997 | Bard et al. | 235/462 |
| 5,750,976 A | | 5/1998 | Eastman et al. | 235/472 |
| 5,786,581 A | | 7/1998 | Eastman et al. | 235/455 |
| 5,804,809 A | | 9/1998 | Eastman et al. | 235/472 |
| 5,814,803 A | | 9/1998 | Olmstead et al. | 235/462 |
| 5,923,020 A | | 7/1999 | Kurokawa et al. | 235/454 |
| 5,923,021 A | | 7/1999 | Dvorkis et al. | 235/455 |
| 5,945,670 A | * | 8/1999 | Rudeen | 250/235 |
| 5,962,838 A | | 10/1999 | Tamburrini | 235/462.45 |
| 6,045,045 A | | 4/2000 | Detwiler | 235/467 |
| 6,056,198 A | | 5/2000 | Rudeen et al. | 235/462.24 |
| 6,094,288 A | | 7/2000 | Tamburrini | 359/214 |
| 6,114,712 A | | 9/2000 | Dvorkis et al. | 250/566 |
| 6,152,372 A | | 11/2000 | Colley et al. | 235/472.01 |
| 6,166,375 A | | 12/2000 | Ahten et al. | 250/234 |
| 6,273,337 B1 | | 8/2001 | Detwiler et al. | 235/462.32 |
| 6,303,927 B1 | | 10/2001 | Ahten et al. | 250/234 |
| 6,575,368 B1 | | 6/2003 | Tamburrini et al. | 235/462.25 |
| 6,621,070 B1 | | 9/2003 | Ahten et al. | 250/234 |

* cited by examiner

D = 270MM

D = 170MM

D = 70MM

D = 20MM

D = 0MM

OFF-AXIS OBJECT DETECTION SYSTEM FOR A BAR CODE SCANNER

RELATED APPLICATIONS

This application is a continuation of application Ser. No. 09/682,660, filed Oct. 3, 2001, now U.S. Pat. No. 6,621,070, which is a continuation of application Ser. No. 09/575,695 filed Jul. 6, 2000, now U.S. Pat. No. 6,303,927 issued Oct. 16, 2001, which is a divisional of application Ser. No. 08/942,399 filed Oct. 1, 1997, now U.S. Pat. No. 6,166,375, issued Dec. 26, 2000, which claims priorty to provisional application Ser. No. 60/027,963, filed Oct. 8, 1996, each of which is incorporated by reference.

BACKGROUND OF THE INVENTION

The field of the present invention relates generally to data capture systems and more specifically to data readers, such as scanners and bar code reading devices.

Although the following description of this invention makes reference to bar code scanners, by way of example, the invention itself is equally applicable to other methods and systems for data reading and forms of encoded data (indicia) other than bar codes.

From an operational point of view, bar code scanners are typically operated in one of two modes, fixed or handheld. In the fixed mode of operation, objects with bar codes thereon are moved to or past a stationary bar code scanner for scanning. In the handheld mode of operation, a portable bar code scanner is typically oriented and/or moved to the bar code label to be read. For purposes of this description, the term bar code scanner shall henceforth denote a scanner of the spot scanning type, wherein an illumination spot is moved across a bar code. The bar code scanners described herein may utilize any number of scan patterns comprising any number of scan lines in any configuration suitable for bar code scanning applications and projected through any number of scan windows. Further details application Ser. No. 60/010,935 and U.S. Pat. No. 6,575,368 entitled "Multi-Aperture Data Reader for Multi-Mode Operation" and Ser. No. 60/021,783 and U.S. Pat. No. 5,962,838 entitled "Bar Code Scanner with a Manually Switchable Scan Pattern" herein incorporated by reference as if fully set forth herein.

A bar code label comprises a series of parallel dark bars of varying widths with intervening light spaces, also of varying widths. The information encoded in the bar code is represented by the specific sequence of bar and space widths, the precise nature of this representation depending on the particular bar code symbology used. Methods for reading bar codes may comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding.

A common and well-developed method for converting the spatial bar/space sequence into a temporal high/low voltage sequence is the method of bar code reading. A bar code scanner typically has an optical system (also referred to as an opto-mechanical system) with two subsystems: an illumination subsystem which produces an illumination beam and a collection subsystem which collects and detects light. The illumination subsystem, typically comprising a light source, a focusing lens, and a scan engine, focuses an outgoing light beam to a minimum diameter, known as the waist, and generates a scan pattern so that the illumination beam, or spot, is likely to be scanned across a bar code. The collection subsystem, which typically includes a collection lens, or alternatively a concave collection mirror or functional equivalent thereof, and a photodetector, collects at least some of the light scattered and/or reflected from the bar code illuminated by the illumination beam and focuses the same onto the detector. The photodetector produces an analog signal having an amplitude determined by the intensity of the collected light. The photodetector, for example, may generate a high voltage when a large amount of light scattered from the bar code impinges on the detector, as from a light space, and likewise may produce a low voltage when a small amount of light scattered from the bar code impinges on the photodetector, as from a dark bar. When the illumination and collection paths/axes are substantially coincidental, the system is typically referred to as a retro-directive.

The illumination source in "spot" bar code scanners is typically a laser, but may comprise a coherent light source (such as a laser or laser diode) or a non-coherent light source (such as a light emitting diode). A laser illumination source offers the advantages of high intensity illumination which may allow bar codes to be read over a large range of distances from the bar code scanner and under a wide range of background illumination conditions (the area in which a bar code may be consistently read by the scanning system is commonly referred to as the depth of field). The scanner's ability to read bar codes at the outer extremes of the depth of field (far field) is, however, limited in part by collected optical power, which decreases approximately as the inverse of the square of the distance from the scanner. It is desirable for a bar code scanner to be capable of reading bar codes over an extended distance from the scanner, that is, to have a large depth of field. Many improvements have been made to bar code scanners to extend their depth of field. One such improvement is disclosed in Rudeen et al. U.S. Pat. No. 5,479,011 entitled "Variable Focus Optical System For Data Reading", the patent being hereby incorporated by reference. The Rudeen '011 patent discloses a variable width aperture disposed in the outgoing optical path thereby varying the location of the beam waist and enabling the scanner to read bar codes over a greater depth of field. Another embodiment is disclosed in Bailey et al. U.S. Pat. No. 4,978,860 entitled "Optical System for a Large Depth of Field Bar Code Scanner", the patent being hereby incorporated by reference. The Bailey '860 patent discloses a scanner utilizing a tilted detector array to extend the depth of field of the reading device. Another improvement is disclosed in Reddersen et al. U.S. Pat. No. 5,438,187 entitled "Multiple Focus Optical System for Data Reading Applications" the patent being hereby incorporated by reference. The Reddersen '187 patent discloses a system which utilizes a multiple focus lens as a means of extending the bar code scanner's depth of field.

There have been several other suggestions on how to increase the depth of field in previous bar code scanner systems. In another system, a focusing lens is designed with an axially movable lens element (such as a zoom lens) to permit changing the focusing power to change the depth of field. Such systems require complicated mechanical lens adjustment and/or may require the user to manually make focusing adjustments. It is desirable to eliminate the need for focus adjustments by the user or complicated mechanical devices.

Another previous method employed to improve depth of field for bar code scanning systems is over-filling the detector in the near field. Because collected optical power decreases approximately as the square of the distance from the scanner, many bar code scanning systems amplify the detected signal in order to read bar codes in the far field. Amplification boosts the detected signal generated by the photodetector. This amplification (or gain), however, boosts some detected signals, typically in the near field, to levels beyond the dynamic range of the bar code scanner's detection and signal processing systems. Although enabling a bar code scanner to read bar codes in the far field, amplification of detected signals generated from scanning bar codes in the near field will frequently boost the detected signal to levels outside the functioning dynamic range of the detection and signal processing systems. Increasing the dynamic range of the detection and signal processing systems (components) typically requires more expensive and complex components with a potential concomitant deterioration of bar code scanner performance. That is, a lower first pass read rate of the bar code scanner and/or a higher mis-read rate. To improve the depth of field and first pass read rate of such systems, previous collection subsystems are designed to over-fill the detector in the near field. That is, the collection lens, or alternatively the collection mirror or functional equivalents thereof, is designed so the collected light in the near field focuses a spot at the center of the detector which is larger than the detector, thereby over-filling the detector. All the collected light is not detected, thereby limiting the dynamic range of the detected and processed signal. Many other secondary factors may impact the dynamic range, but it is nonetheless desirable to limit such impact. FIG. 7 is a plot of the power collected vs. the distance from the collection lens for a certain bar code scanning system and particular conditions wherein the detector is filled when the bar code is approximately 5.3 inches from the detector. As indicated in FIG. 7, the dynamic range is limited from approximately 800 nW to 200 nW when a bar code is scanned in a range of approximately 4–8.5 inches from the collection lens. Consequently, bar codes over a greater depth of field may be read for a given dynamic range of detection and signal processing systems.

Other previous bar code scanning systems have had optical systems which offset the collection axis from the axis of outgoing light, however, significant differences and purposes exist in these previous systems. These optical systems were designed with an offset to minimize the amount of collected light the illumination focusing lens was keeping from reaching the detector while substantially coaxially aligning the collection axis and the axis of outgoing light in retro-directive bar code scanning systems. Initially the two axes were very close together (approximately 0.1 inches apart) because the focusing lens was superimposed (off the central axis of the collection lens) in the collection lens. Moreover, the collection lens and focusing lens were aligned such that their optical axes optimally converged within the scan volume (were as close together as possible).

SUMMARY OF THE INVENTION

The present invention is directed to a method of data reading and an optical system such as for a bar code scanner. In a preferred configuration, the optical system has an axis of outgoing (illumination) light offset from the axis of collected light, which limits the dynamic range of the collected light and therefore the dynamic range within which the bar code scanner detector and signal processor must function. Preferably, the outgoing axis and the collection axis are substantially parallel.

Additional aspects and advantages of this invention will be apparent from the following detailed description of preferred embodiments, which proceeds with reference to the accompanying drawings.

DETAILED DESCRIPTION OF PREFERRED EMBODIMENTS

Preferred and alternative embodiments of the subject invention will now be described in detail with reference to the drawings.

Figure 1:
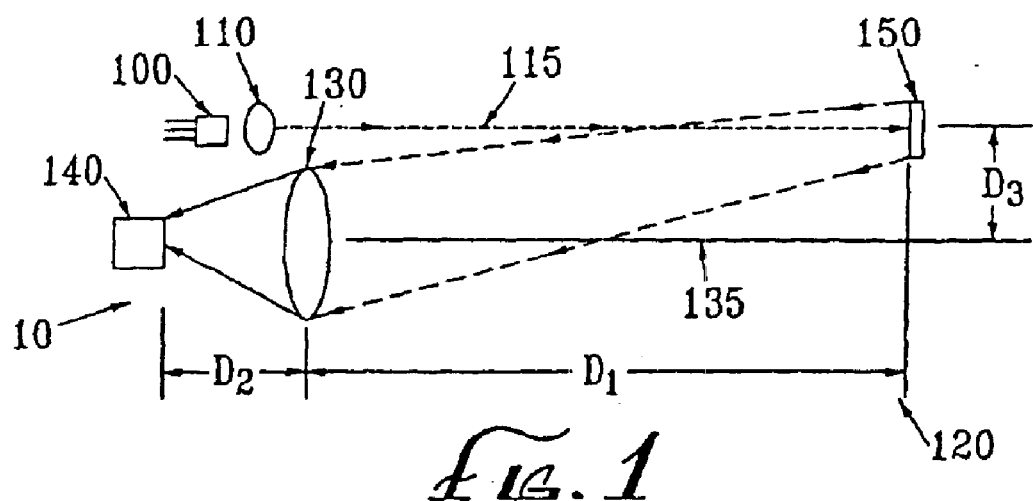
FIG. 1 is a schematic diagram of an illumination subsystem and a collection subsystem according to a preferred embodiment of the present invention.

In a preferred configuration as shown in FIG. 1, the optical system is provided with an axis 115 of outgoing (illumination) light offset from and substantially parallel to the axis 135 of collected light to limit the dynamic range. Offsetting the two axes will cause the spot generated by the collection lens 130 to migrate across the detector 140 (or array of detectors) when bar codes 150 are read in the near field. Migration limits the dynamic range required of the detection and signal processing systems because as the bar code moves closer to the collection lens, less of the light collected therefrom impinges on the detector 140 when the bar code 150 is scanned. Moreover, signal amplification may be increased without exceeding the dynamic range of the detection and signal processing systems, which enables the bar code scanner 10 to more readily and reliably read bar codes in the far field. The depth of field is thereby extended such that the volume within which a bar code may be successfully scanned (i.e., scan volume) is larger, which, of course, increases the likelihood a bar code will be read during its first pass (when swept by or presented to the scanner).

Alternatively, signal amplification may be left unchanged thereby improving the performance of the detection and signal processing systems. The subject invention limits the dynamic range within which the detection and signal processing systems must function. Detection and signal processing components function optimally and bar code scanning is improved (first pass read rate and reading accuracy) if these components are not pushed to their dynamic range limits. Alternatively, less expensive and/or complex components which are designed to work within a smaller dynamic range may be used without compromising bar code scanner performance.

To offset the two axes, the focusing lens 110 may be located adjacent to the collection lens 130 but not superimposed thereon (side by side). This arrangement keeps the focusing lens 110 from preventing light from reaching the detector 140.

The outgoing axis 115 is preferable parallel to the collection axis 135, but may vary somewhat from absolutely parallel. In an actual construction the alignment of the axes 115, 135 varies by about 3°. Thus the alignment may vary from substantially parallel (about +/−5°) or may vary by even a greater amount (e.g. 10°) depending upon the particular configuration.

Figure 2:
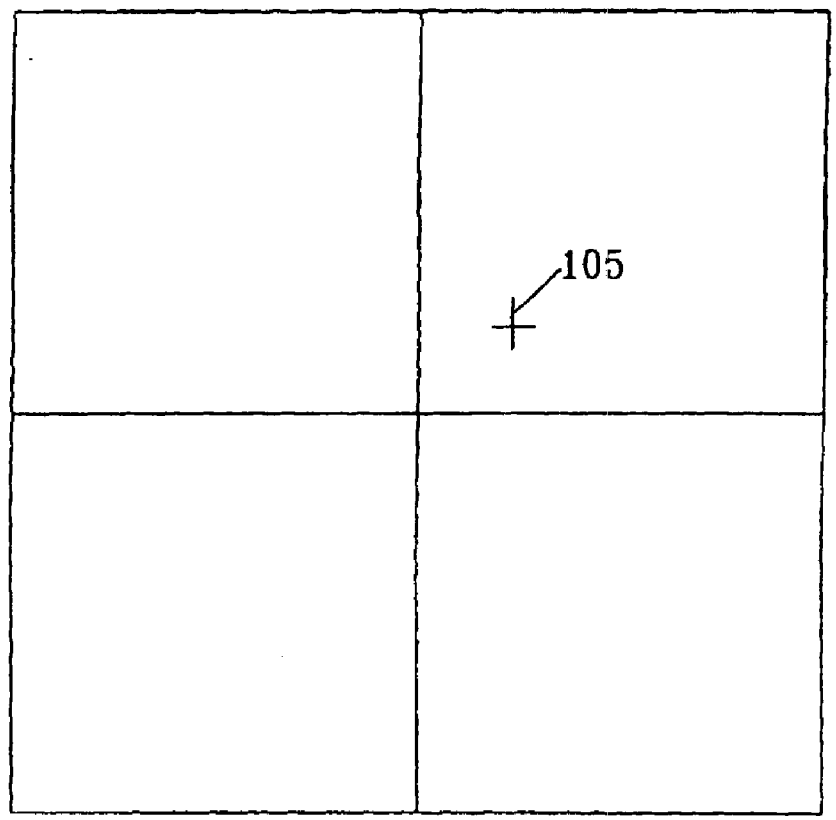
FIGS. 2–6 depict the size and location of the collected and focused spot on the detector.
Figure 3:
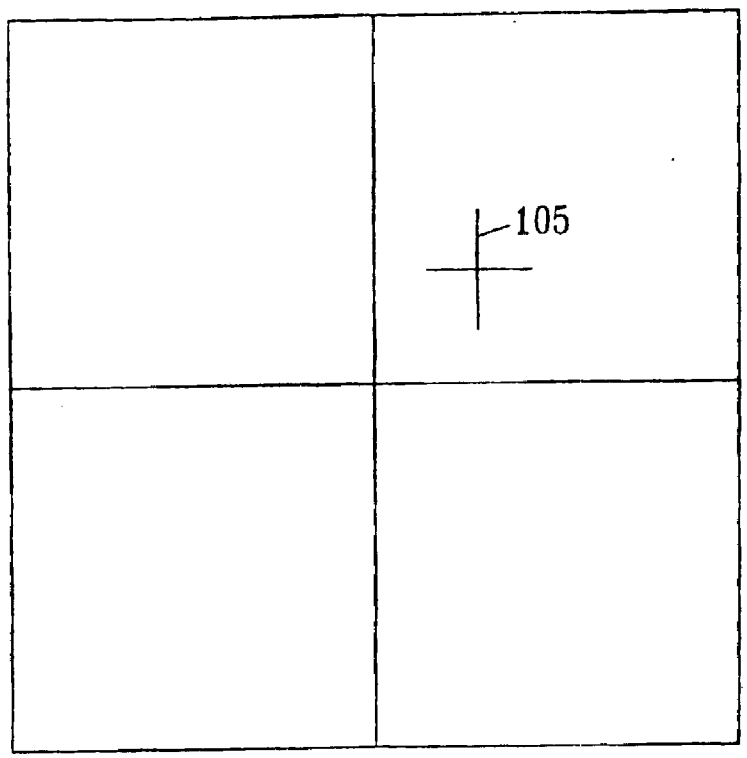
Figure 4:
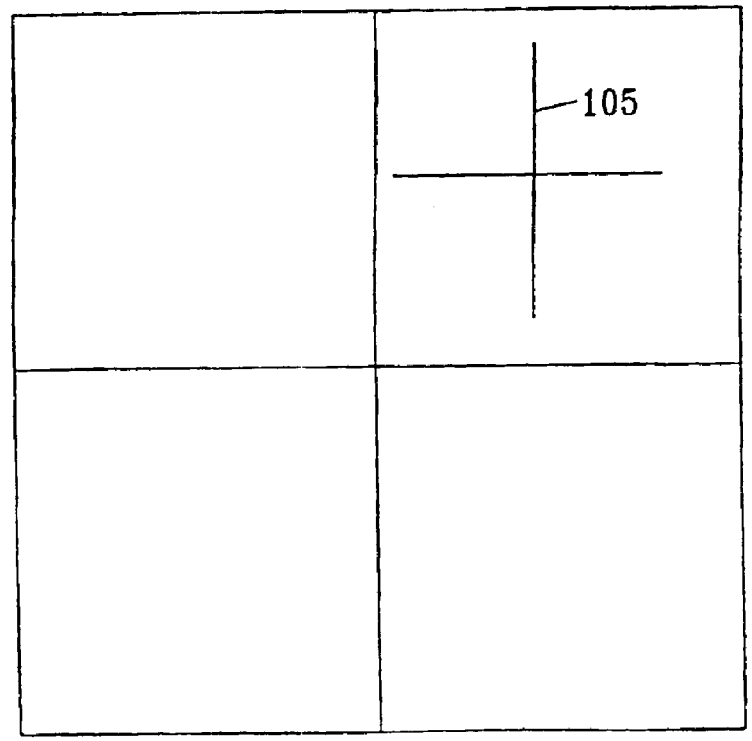
Figure 5:
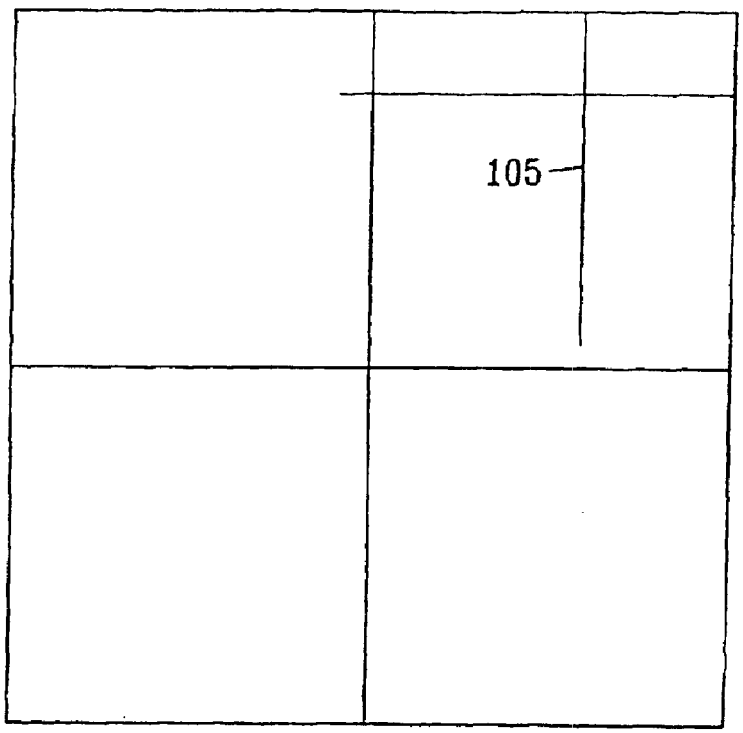
Figure 6:
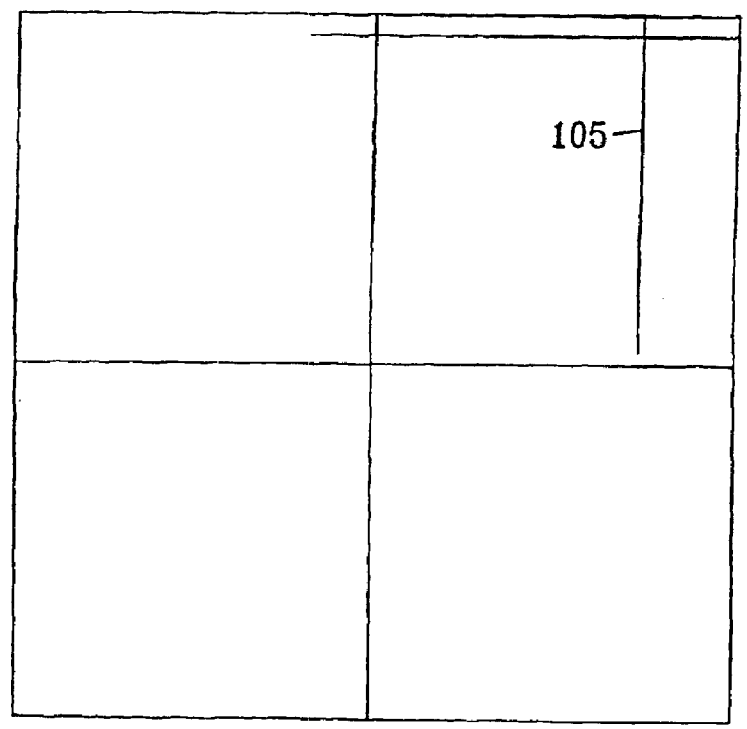

FIG. 1 illustrates an optical system 10 comprising light source 100 (typically a visible laser diode), focusing optics 110 (preferably both light source 100 and necessary focusing optics are housed in a visible laser diode module), scanning mechanism downstream of focusing optics 110 aligned on outgoing optical axis 115, detector 140 (preferably a photodiode), and collection optics 130 aligned on collection optical axis 135, and an imaging photodetector 140 at focal plane 120. The scan generating mechanism is not shown, but is well known and may comprise any suitable scanning mechanism such as a pivoting mirror, rotating mirror, rotating hologram, or moving light source. An object 150 to be scanned with a bar code affixed thereto or printed thereon is shown at focal plane 120. The offset of the two axes 115 and 135, as measured by distance D3, causes the spot focused on detector 140 by collection lens 130 to migrate across detector 140, and eventually off detector 140, as the object 150 is moved progressively closer to collection lens 130 and is scanned. FIGS. 2–6 depict this migration. Other dimensions which figure prominently are D2, the distance from detector 140 to collection lens 130, and D1, the distance from collection lens 130 to the bar code to be scanned. In a preferred embodiment of the subject invention D1 is approximately 15 inches, D2 is approximately 0.6 inches, D3 is approximately 3 inches, and focal length of collection lens 130 is approximately 0.6 inches, and the axis 115 is substantially parallel to axis 135 (varying by about 3°). FIGS. 2–6 illustrate the location of the spot 105 at decreasing distance D as measured from the bar code scanner nose (not shown) to the scanned bar code, wherein the distance from the collection lens 130 to the nose is approximately 3 inches:

| Figure | D -- Distance from scanner nose to barcode |
|--------|---------------------------------------------|
| FIG. 2 | 270 mm |
| FIG. 3 | 170 mm |
| FIG. 4 | 70 mm |
| FIG. 5 | 20 mm |
| FIG. 6 | 0 mm |

As illustrated in FIGS. 2–6 not only does the center of the spot 105 focused on detector 140 migrate farther from the center of the detector as the bar code gets progressively closer to collection lens 130 (near field), but defocusing occurs, that is, the spot size grows larger. As the bar code scanned gets progressively closer to collection lens 130, the intensity of the light collected also increases as the inverse square of the distance from collection lens 130. Therefore, as graphically depicted in FIG. 8, the dynamic range is limited as a result of a portion of the spot incident on detector 140 having migrated off the detector 140.

Figure 7:
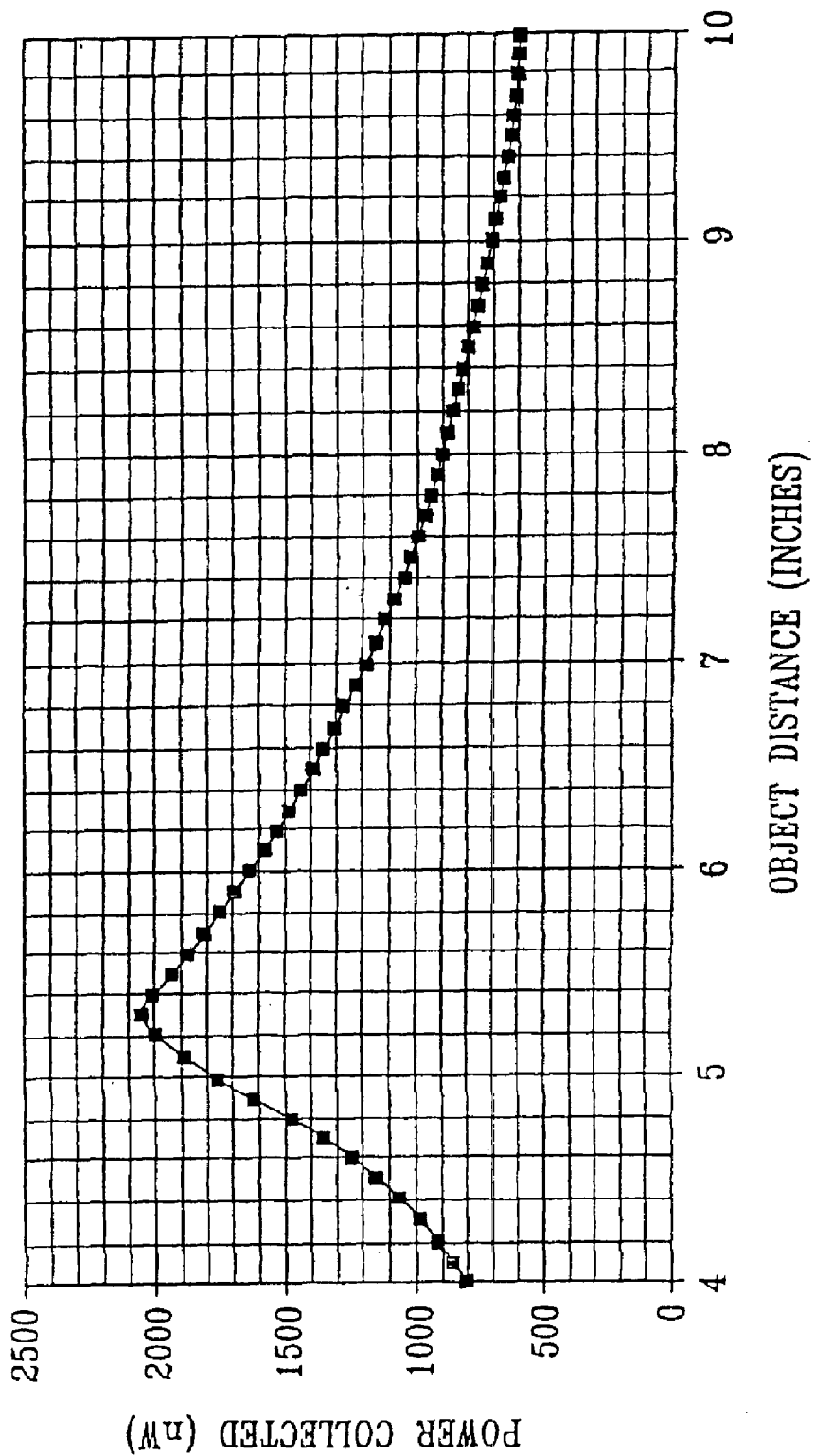
FIG. 7 is a graph of collected power versus distance for an optical system which over-fills the detector in the near field.

Thus the optical system 10 provides an improved means of limiting the dynamic range. As shown by a comparison of the graphs of FIG. 7 and FIG. 8, moving the collected spot off the detector (FIG. 8) lowers the power collected more gradually than simply over-filling the detector (FIG. 7). Although a number of factors may impact these plots, migrating the incident spot off the detector has the advantage of limiting the dynamic range over a greater depth of field. Offsetting outgoing optical axis 115 from collected optical axis 135 limits the dynamic range to a greater degree than simply over-filling the detector.

Limiting the dynamic range has a number of benefits. Collected signal amplification may be increased without exceeding the dynamic range of the detection and signal processing systems when bar codes are scanned in the near field. Amplification enables the bar code scanner to read bar codes in the far field thereby extending the depth of field and increasing the likelihood a bar code will be read during its first sweep by or presentation to the scanner. Other factors play a role in a bar code scanner's ability to extend its depth of field by signal amplification, including the bandwidth of the amplification system, spot size in the far field, and the signal to noise ratio. Nonetheless, many systems which offset the axis of outgoing light from the axis of collected light will be able to increase the amplification of the detected signal which will enable the bar code scanner to read bar codes farther from the scanner without compromising performance in the near field (i.e., extend the depth of field). An increase in the size of the depth of field increases the scan volume within which a bar code may be read, which in turn increases the likelihood that a bar code presented to or swept by the bar code scanner will be in the scan volume and thus be successfully read. First pass read rate is a critical performance criterion for bar code scanners.

On the other hand narrowing the dynamic range of a bar code scanning system while maintaining the depth of field may also be of benefit. Detection and signal processing systems are able to successfully read bar codes within a certain range of collected signals. In lieu of increasing amplification as a means of extending the depth of field when the subject invention is employed, alternatively amplification may remain the same so that the detection and signal processing systems experience a more limited dynamic range, that is, a smaller dynamic range. Detection and signal processing performance deteriorates at the extremes of their dynamic range. Limiting the dynamic range within which the detection and signal processing systems typically have to operate improves detection and signal processing performance which in turn improves bar code scanner performance (including edge detection, first pass read rate, and scanning accuracy). Alternatively, less expensive and/or complex components which are designed to work within a smaller dynamic range may be used without compromising bar code scanner performance.

As depicted in FIG. 1, wherein collection lens 130 and focusing lens 110 are side by side and not superimposed, focusing lens 110 does not prevent backscattered or reflected light from the scanned bar code from reaching the detector 140. This arrangement allows the maximum light possible, for a given collection system, to be collected. Although this may be undesirable when bar codes are scanned in the near field, it is critical to bar code scanner performance in the far field and to extending the depth of field.

The various optical systems described above may be provided in efficient configurations incorporated into a scan module. FIGS. 9–13 illustrate one such scan module 400 incorporating the optical system of FIG. 1. The scan module 400 includes (1) a main housing 450, (2) a dithering assembly 401, (3) a laser diode module 452 and a collection lens 470 mounted to the housing 450 via clamp 454, (4) a collection fold mirror 472 positioned at 450 behind the collection mirror, and (5) a detector 419 mounted to the underside of PCB 415 over collection fold mirror 472.

The collection lens 470 may be constructed from any suitable lens material such as glass or plastic. The lens 470 is preferably constructed from plastic and integrally molded within its own plastic support bracket 471. The bracket 471 is readily assembled by sliding the bracket 471 into place within the housing 450. The bracket 471 includes a U-shaped end portion 471a which securely attaches to a lip 451 in a side of the housing 450. This integral collection lens 470 and lens bracket 471 assembly reduces the number of module components thereby simplifying module structure and assembly.

The dithering assembly 401 comprises a dithering mirror 402 mounted to mirror bracket 403. A mounting member 414 mounted on a base or housing member 450, bending member or flexure 412 is mounted between the mounting member 414 and the mirror bracket 403. The mounting bracket 403 is pivotally supported on the mounting member 414 via bending member 412. Though they provide no function during normal operation, shock pin(s) 413 are included to constrain motion of the ditherer under high external mechanical conditions (such as when the unit is dropped) to prevent damage to the bending member 412. The drive magnet 404 is also mounted on the mirror bracket 403 with the drive coil 406 mounted to the PCB 415. The feedback sensor 408 (such as a Hall effect sensor) is mounted to the underside of the PCB 415 (shown by the dashed lines in FIG. 9) in a position adjacent the feedback magnet 410 mounted to the mirror bracket 403. The motion of mirror 402 is driven by passing an oscillating drive current through drive coil 406. The drive coil 406 (shown by the dashed lines in FIG. 9) is attached to the underside of PCB 415, the actuator coil leads 407 of the drive coil 406 extending through the board 415. When the PCB 415 is installed, the drive coil 406 is positioned in the recess 405 adjacent the actuator magnet 404. Travel stops 416, 416 are positioned to restrict the amplitude of the dithering motion to a maximum dithering amplitude.

In operation, the laser diode module 452 generates a laser beam 460 which is focused by a collimating lens located within the module barrel, passed 0through the exit slot, and directed onto the dithering mirror 402. The laser diode module 452 is positioned adjacent to the collection lens 470. The collection lens 470 has a cutout notch 473 on one side within which the diode module 452 is positioned thereby providing further compactness of structure and enabling the diode 452 to be located closer to being coaxial with the collection lens 470. The dithering mirror 402 oscillates to produce a scan line. Return signal reflected and/or scattered off an object (e.g. the bar code symbol on an item being scanned) returns to the dithering mirror 402 and is directed to collection mirror 470 which focuses the return beam which is reflected by the 450 fold mirror 472 up to the detector 419 (such as a photodiode). The detector 419 detects and converts the signal into electrical impulses corresponding to, in the case of reading a barcode symbol, the bars and spaces.

The system may comprise additional laser beam focusing features such as described in U.S. Pat. Nos. 5,565,668 and 5,641,958 herein incorporated by reference.

The dithering mirror 402 may be a flat mirror as shown or alternately may be curved thereby providing focusing power. The mirror 402 may alternately include a small inset mirror attached to or molded with the mirror 402 for reflecting the outgoing beam 460.

Figure 14:
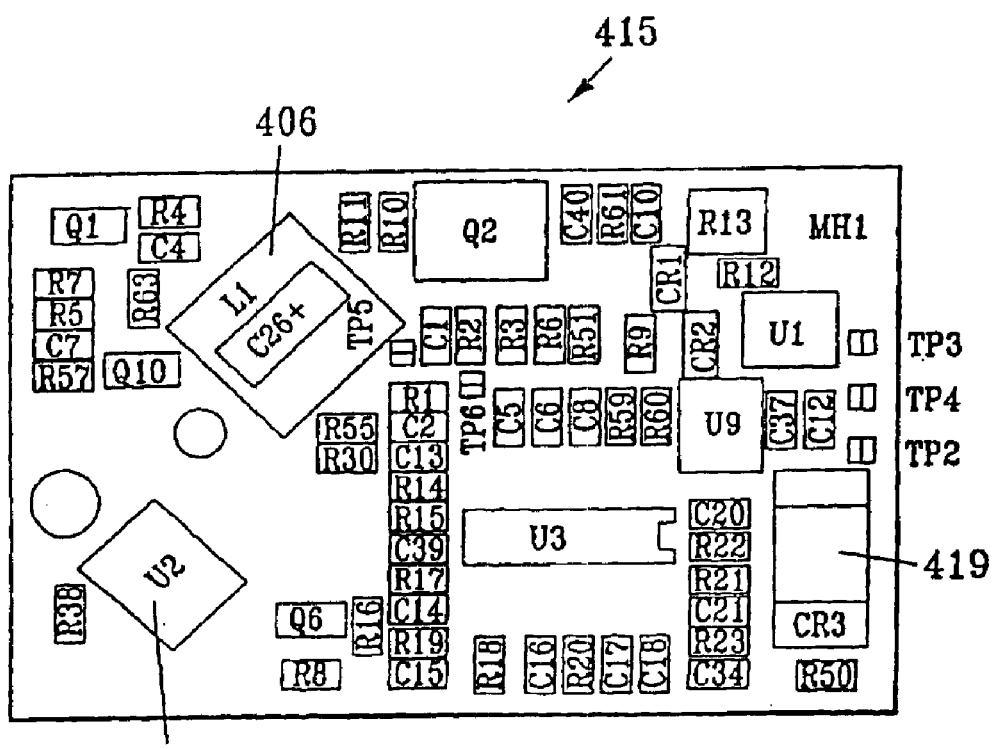
FIG. 14 is a bottom side assembly drawing of the printed circuit board of the scan module of FIG. 9.

The scanner PCB 415 is also configured to provide for compact construction. FIG. 14 is a bottom side assembly drawing of the printed circuit board 415 of the scan module 400 of FIG. 9. Several scanner components are efficiently mounted on the underside of PCB 415 including the detector 419, the actuator coil 406 and the Hall sensor 408. The only electronic component not mounted to the PCB 415 is the laser diode module 452. The leads 453 of the diode module 452 are connected to the connectors 456 on the PCB 415 by a ribbon cable (not shown). The ribbon cable exerts minimal forces on the diode module 452 minimizing potential for misalignment.

Figure 15:
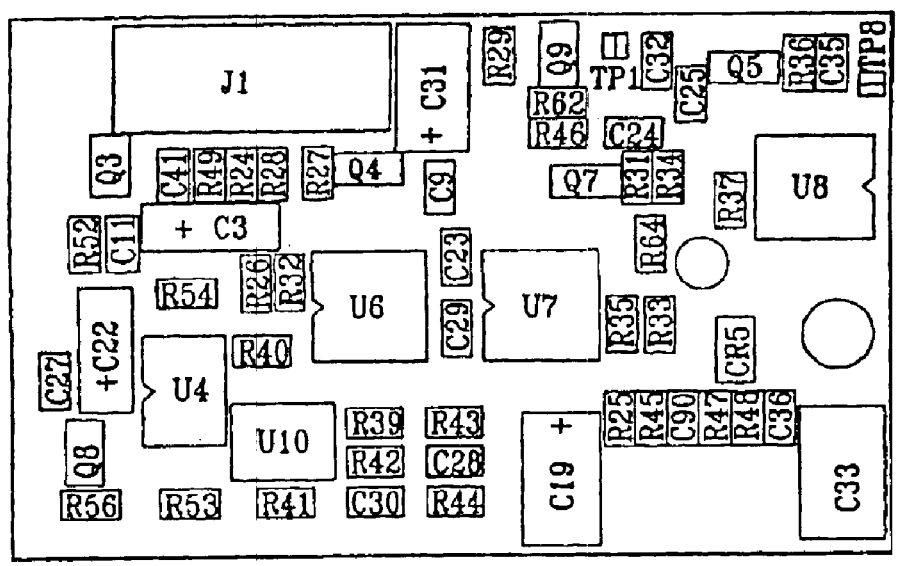
FIG. 15 is a top side assembly drawing of the printed circuit board of the scan module of FIG. 9.

FIG. 15 is an assembly drawing of the top side of the PCB 415 illustrating that the top side of the board contains additional electronic components. By mounting components on both sides of the board, the size of the printed circuit board may be minimized with all module electronics mounted on a single board. Further description of the PCB 415 and the dithering assembly 401 is contained in James E. Colley et al. "DITHERING ASSEMBLIES FOR BAR-CODE SCANNERS" filed Sep. 19, 1997, U.S. application Ser. No. 08/934,487, U.S. Pat. No. 6,152,372, herein incorporated by reference.

Figure 10:
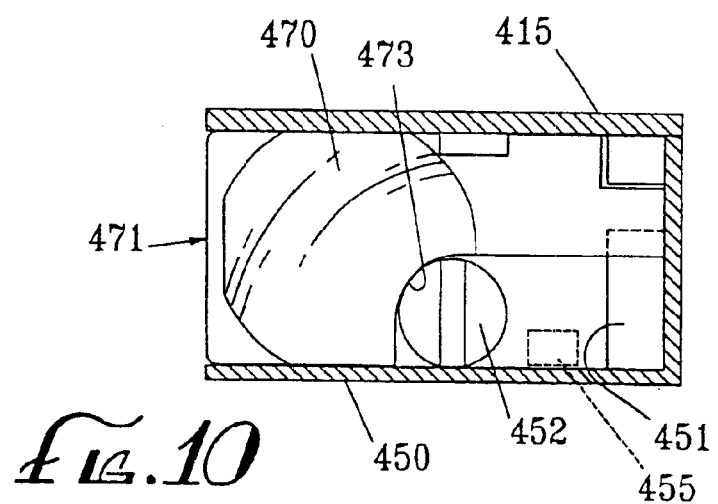
FIG. 10 is a cross sectional view of the scan module of FIG. 9 taken along line 10—10.
Figure 11:
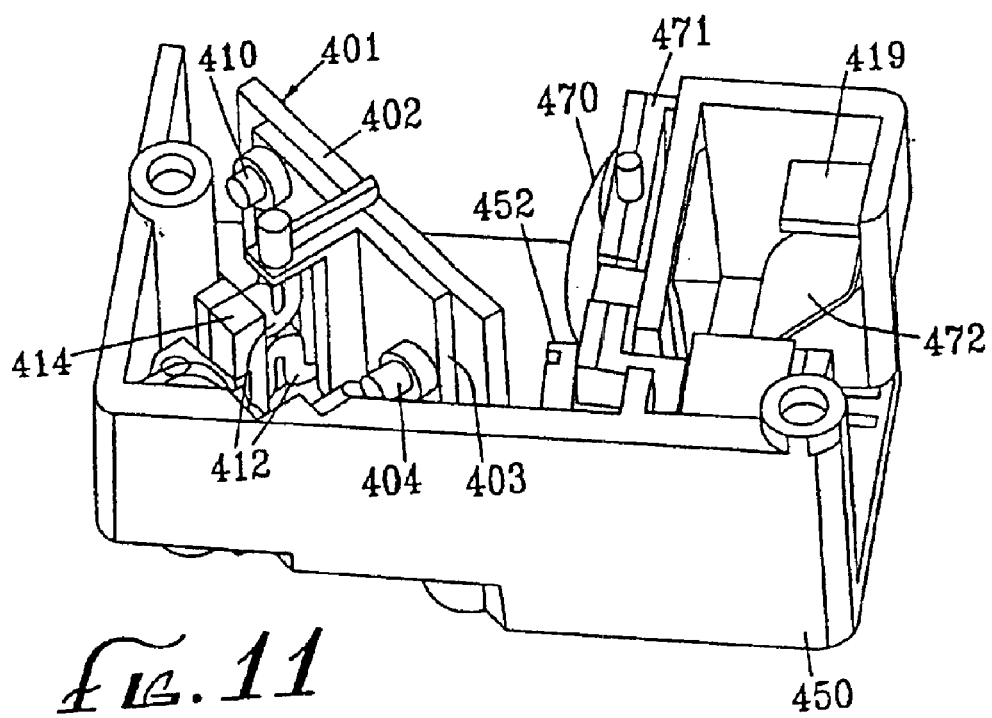
FIG. 11 is a side perspective view of the scan module of FIG. 9 with the printed circuit board removed to reveal internal components.
Figure 12:
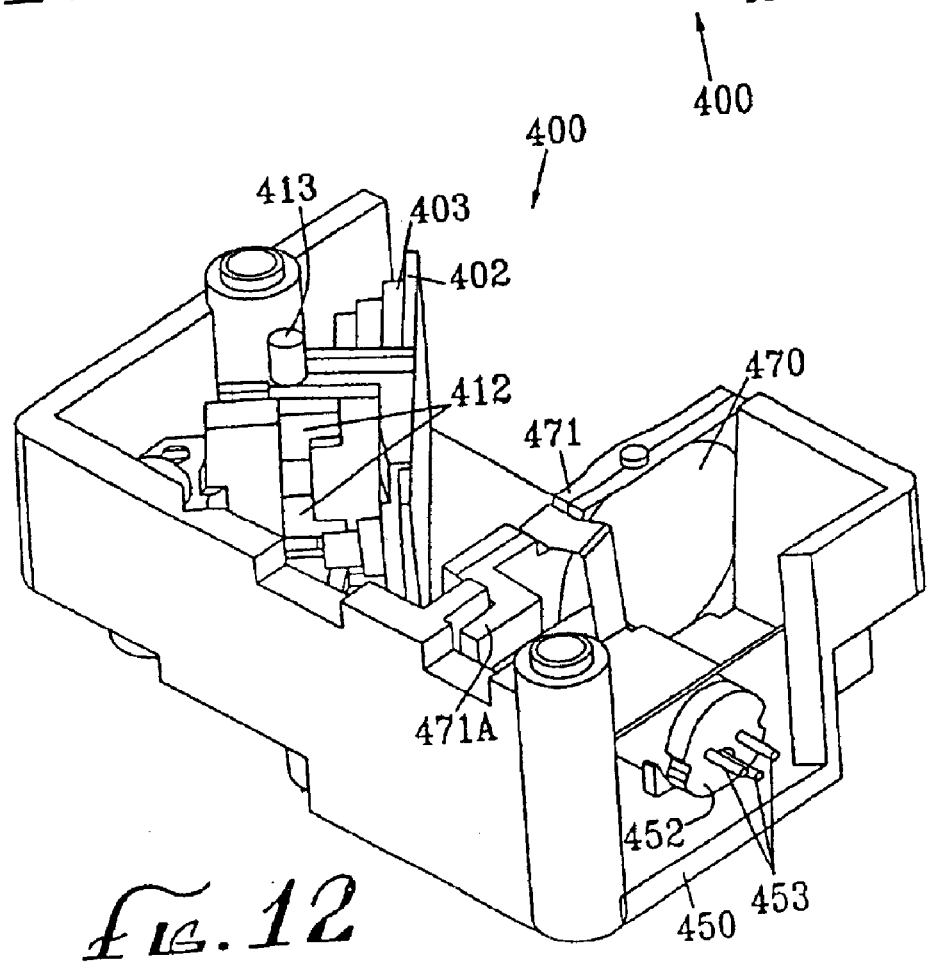
FIG. 12 is a front side perspective view of the scan module of FIG. 9 with the printed circuit board removed to reveal internal components.
Figure 13:
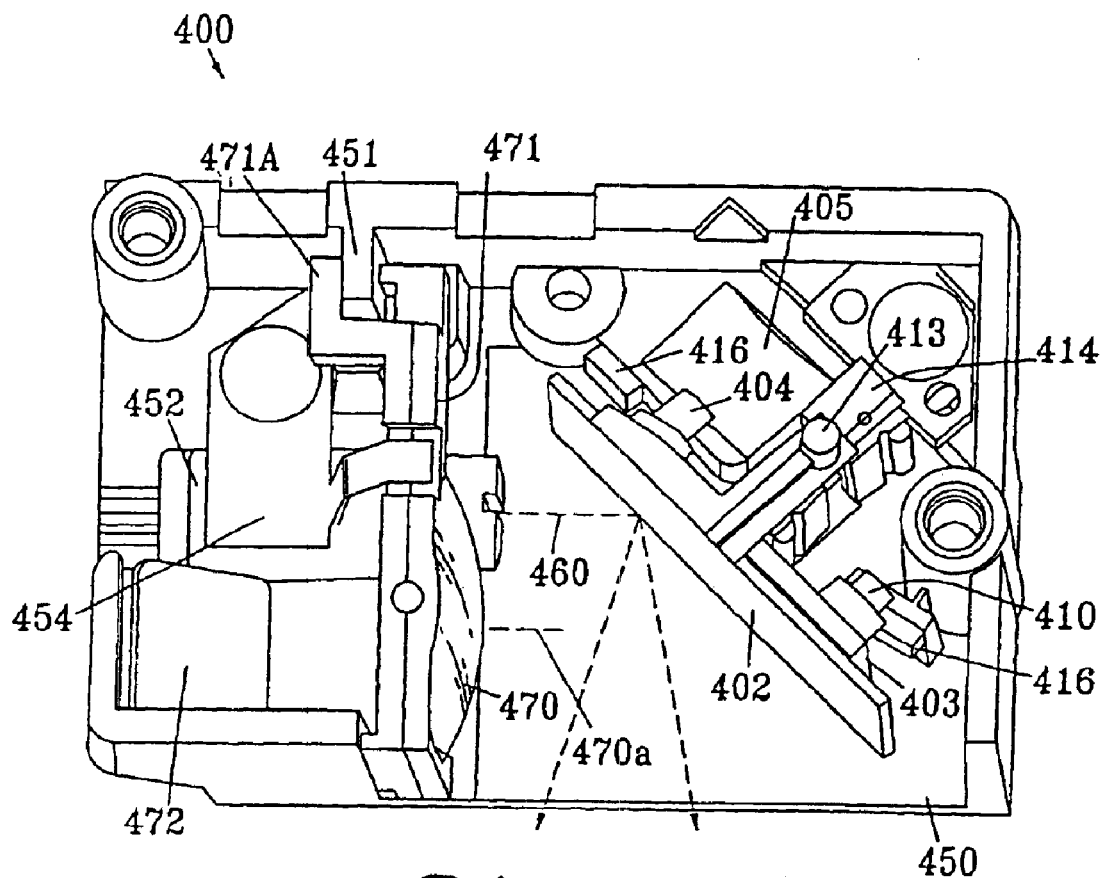
FIG. 13 is a top view of the scan module of FIG. 9 with the printed circuit board removed to reveal internal components.
Figure 16:
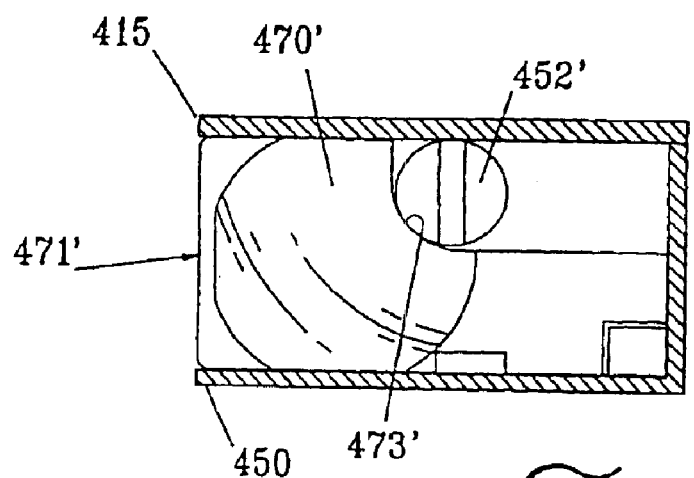
FIG. 16 is a cross sectional view of an alternate scan module configuration.

FIG. 16 is a cross section of an alternate scan module with a view similar to the cross section of FIG. 10, wherein the diode module 452' is mounted to the PCB 415 enabling all the electronic components of the scan module 400 to be compactly and efficiently assembled on a single printed circuit board. By locating the diode module 452' either on the PCB 415 or adjacent thereto, it may be possible to connect the leads (not shown) of the diode 452' directly to the PCB 415 eliminating the need for the ribbon cable of the previous configuration.

Figure 8:
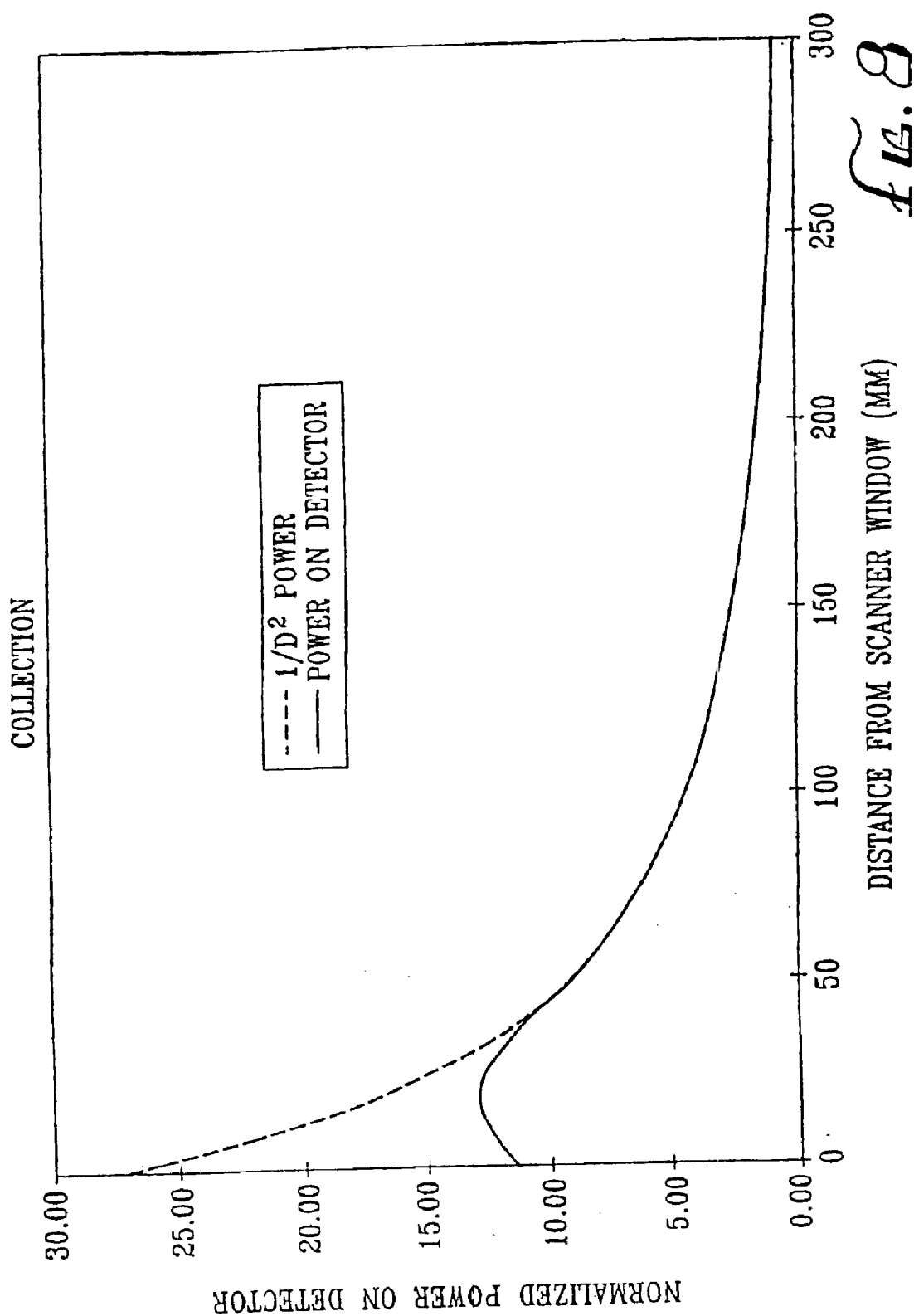
FIG. 8 is a graph of collected power versus distance for an offset optical system.
Figure 9:
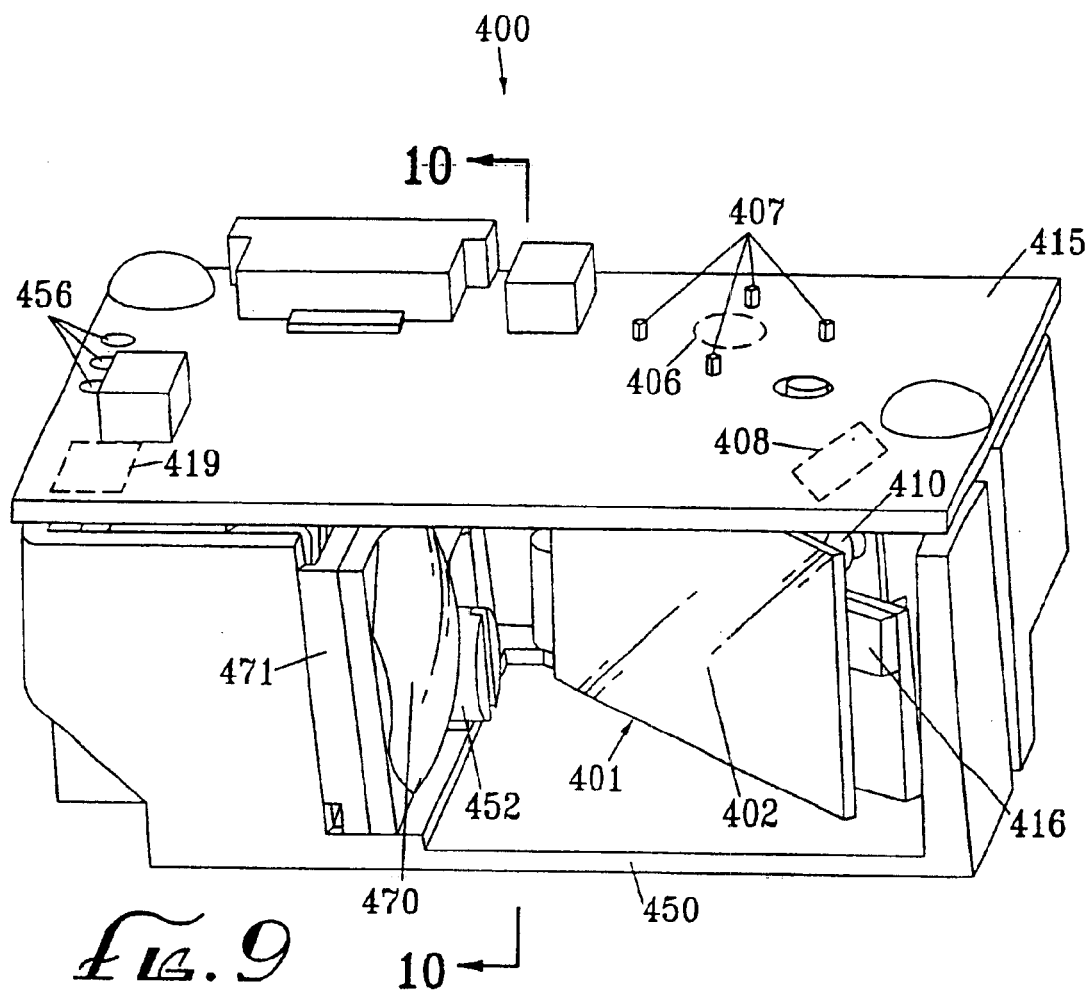
FIG. 9 is a side perspective view of a scanner module with an outgoing optical axis offset from the axis of the collection optics.

In the scan module 400 of FIGS. 9–13, the axis 460 of the outgoing beam and the axis 470a of the collection lens 470 are offset by an amount D3 (as defined in the schematic of FIG. 1). The D3 offset in module 400 is about 0.25 inches. The offset amount for D3 is selected to provide the desired degree of beam movement to correspond to desired limiting of dynamic range. Referring to FIGS. 2–6 and 8, the smaller D3, the less spot movement as the item is moved closer to the scanner. As shown in FIG. 8, as the amount D3 approaches zero, that is as the two axes 115, 135 of FIG. 1 approach coaxial, the power on detector approaches the dashed line. The larger D3, the more spot movement and the more rapidly the power on detector, designated by the solid line, drops off. If D3 becomes too large, then the spot may fall entirely off the detector at near field and the power on detector would fall to zero. Thus, by experimentation for a particular scanner configuration, D3 may be empirically chosen to provide the desired limiting of dynamic range.

In an alternate embodiment, means may be provided to adjust the offset D3 thereby providing adjustable limiting of dynamic range. Such means for adjusting the offset D3 may comprise, for example, suitable mechanical mechanisms which adjust the position of the beam axis 115, the source 100, the lens 110 or the lens 130. Such a suitable mechanism may corn rise a mechanical mechanism 455 which adjusts the position of the light source (diode module 452). Alternately, the offset D3 may be adjusted electro-optically such as via multiple beam sources, electrically contrtolled LCD element(s), or piezoelectric element(s).

A band pass filter, corresponding to the wavelength of the optical beam, may be provided in the collection path to prevent light of unwanted wavelength from reaching. The filter (not shown) may comprise a small glass element attached directly to the detector 408 via double sided tape or other suitable means and may be approximately the same size as the detector.

Alternately, a corrective optical element, such a diffuser plate, may be disposed between the collection lens 470 and the detector 408 such as described in application Robert W. Rudeen et al. Ser. No. 60/054,962 entitled COLLECTION SYSTEM FOR RANGE ENHANCEMENT filed Aug. 7, 1997 hereby incorporated by reference. The corrective optical element may provide further range enhancement. The corrective optical element may be conveniently attached directly to the detector 408 or to the band pass filter described above thereby minimizing size and cost of manufacture. The corrective optical element and the band pass filter may comprise: a single combined optical element; two separate optical elements mounted together or separately.

Certain aspects of the preferred embodiments described above may have one or more of the following advantages:

- to provide an optical system for a bar code scanner wherein a reduced dynamic range is required of signal detection and processing systems;
- to provide an optical system for a bar code scanner which has a larger depth of field;
- to provide an optical system for a bar code scanner which improves bar code scanning performance;
- to provide an optical system for a bar code scanner wherein the detection and signal processing systems may be simplified without compromising bar code scanner performance;
- to provide a simplified optical system producing a compact scan module without compromising bar code scanner performance;
- to provide a scanning system or scan module with a simplified electronic collection system without electronic gain control;
- to provide a compact and efficiently constructed scan module;
- to provide an optical system for a bar code scanner wherein the focusing lens does not prevent backscattered or reflected light from reaching the detector.

Though certain examples and advantages have been disclosed, further advantages and modifications may become obvious to one skilled in the art from the disclosures herein. The invention therefore is not to be limited except in the spirit of the claims that follow.

It will be obvious to those having skill in the art that many changes may be made to the details of the above-described embodiments without departing from the underlying principles of the invention. The scope of the present invention should, therefore, be determined only by the following claims.

What is claimed is:

1. A method of data reading comprising the steps of generating an optical beam and directing the optical beam along an outgoing axis;
   scanning the optical beam across a target;
   collecting return light scattered and/or reflected from the target via a collection element and directing the return light toward a detector;
   offsetting the outgoing axis of the optical beam from an incoming axis of the collection element;
   causing a portion of the return light to fall off the detector as the target nears the collection element.

2. A method according to claim 1 further comprising causing an increased portion of the return light to fall off the detector as the target nears the collection element.

3. A method according to claim 1 further comprising arranging the outgoing axis of the optical beam parallel to the incoming axis of the collection element.

4. A method according to claim 1 wherein the outgoing axis and the incoming axis are arranged substantially parallel +/−5° to each other.

5. A method according to claim 1 further comprising causing all the return light collected from an objected located at far via the collection element to fall on the detector.

6. A scanner for scanning an optical code comprising:
   a light source generating a reading beam and projecting said reading beam along an outgoing axis toward the optical code, and effecting back scattered light therefrom;
   a detector;
   a collection element having an optical axis laterally offset from said outgoing axis of the reading beam, said collection element focusing said back light toward said detector,
   wherein said detector is laterally offset from said light source, and positioned for receiving scattered light from said collection element such that dynamic range of the back scattered light reaching said detector is limited by causing an increased amount of said back scattered light to fall off said detector as the optical code is located nearer to the scanner.

7. A scanner according to claim 6 wherein said collection element comprises a lens including a hole or notch extending therethrough and laterally offset from said optical axis.

8. A scanner according to claim 7 wherein said light source is disposed in said hole or notch.

9. A scanner according to claim 7 wherein said hole or notch is spaced radially outward from said optical axis of said lens.

10. A scanner according to claim 6 wherein said optical axis of said collection element is parallel with said outgoing axis.

11. A scanner according to claim 6 wherein the optical axis and the incoming axis are arranged substantially parallel +/−5° to each other.

12. An optical scanning system comprising
   a housing;
   a light source, disposed in the housing, for generating an optical beam along an outgoing optical path toward an object to be scanned;
   a detector for detecting light reflected off the object;
   a collection assembly comprising a collection element integrally-molded within a support bracketed portion, the support bracket portion being mounted in a pre-aligned location within the housing and the collection, element collecting the light reflected and/or refracted off the object and focusing it onto the detector.

13. A system according to claim 12 wherein the collection element comprises a notch in one side thereof, and wherein the light source comprises a laser diode module disposed in the notch.

14. A system according to claim 12 wherein the axis of the collection element is laterally offset from the outgoing optical path of the optical beam.

15. A system according to claim 12 further comprising
a printed circuit board mounted on the housing, wherein the detector is mounted on the printed circuit board.

16. A system according to claim 12 wherein the scanning mirror assembly includes a magnetic dither drive, wherein the scan module further comprising a feedback sensor mounted on the printed circuit board.

17. A system according to clam 12 wherein the scanning mirror assembly comprises a magnetic dither drive having a drive coil mounted on the printed circuit board.

18. A system according to claim 12 wherein the light source comprises a laser diode module.

19. A system according to claim 12 further comprising a fold mirror disposed between the collection element and the detector for directing light being focused by the collection element toward the detector.

\* \* \* \* \*

UNITED STATES PATENT AND TRADEMARK OFFICE
CERTIFICATE OF CORRECTION

PATENT NO. : 6,884,993 B2
APPLICATION NO. : 10/640106
DATED : April 26, 2005
INVENTOR(S) : Michael J. Ahten and James W. Ring It is certified that error appears in the above-identified patent and that said Letters Patent is hereby corrected as shown below:

Column 1
Line 11, change "priorty" to --priority--.
Line 38, after "further details" insert --regarding scan lines, scan patterns, and scan windows may be found in U.S.--.

Column 3
Line 35, change "200 nW" to --2000 nW--.

Column 5
Line 15, change "preferable" to --preferably--.

Column 7
Line 11, change "450" to --45°--.

Column 9
Line 2, change "corn rise" to --comprise--.
Line 5, change "contrtolled" to --controlled--.
Line 9, after "reaching" insert --the detector--.

Column 10
Line 18, change "objected" to --object--.
Line 29, after "said back" insert --scattered--.
Line 32, after "receiving" insert --said back--.
Line 59, change "bracketed" to --bracket--.
Line 61, delete comma after "collection".

UNITED STATES PATENT AND TRADEMARK OFFICE
CERTIFICATE OF CORRECTION

PATENT NO. : 6,884,993 B2
APPLICATION NO. : 10/640106
DATED : April 26, 2005
INVENTOR(S) : Michael J. Ahten and James W. Ring It is certified that error appears in the above-identified patent and that said Letters Patent is hereby corrected as shown below:

<u>Column 12</u>
Line 1, change "clam" to --claim--.

Signed and Sealed this

Eighteenth Day of March, 2008

JON W. DUDAS
*Director of the United States Patent and Trademark Office*